United States Patent [19]
Kern

[11] Patent Number: 6,098,551
[45] Date of Patent: Aug. 8, 2000

[54] TWIN-AXLE RAIL VEHICLE BOGIE

[75] Inventor: Werner Kern, Bad Emstal, Germany

[73] Assignees: Newag GmbH & Co. KG; Maschinen, Apparate-und Geratebau, both of Germany

[21] Appl. No.: 09/091,607

[22] PCT Filed: Dec. 20, 1996

[86] PCT No.: PCT/DE96/02495

§ 371 Date: Jun. 22, 1998

§ 102(e) Date: Jun. 22, 1998

[87] PCT Pub. No.: WO97/23375

PCT Pub. Date: Jul. 3, 1997

[30] Foreign Application Priority Data

Dec. 22, 1995 [DE] Germany ............................ 195 48 437

[51] Int. Cl.⁷ ...................................................... B61F 5/00
[52] U.S. Cl. ...................................................... 105/218.2
[58] Field of Search ............................... 105/157.1, 182.1, 105/218.1, 218.2, 223, 224.05, 224.06

[56] References Cited

U.S. PATENT DOCUMENTS

| | | | |
|---|---|---|---|
| 870,607 | 11/1907 | Amberg | 105/218.2 |
| 2,322,785 | 6/1943 | Knox | 105/218.2 |
| 2,427,066 | 9/1947 | Porteus . | |
| 2,433,902 | 6/1948 | Henrichsen | 105/218.2 |
| 2,981,207 | 4/1961 | Paulsen . | |
| 3,707,926 | 1/1973 | Ellzey | 105/218.2 |
| 3,945,325 | 3/1976 | Zehnder . | |
| 3,974,779 | 8/1976 | Lindblom et al. | 105/218.2 |
| 4,398,469 | 8/1983 | Zelli . | |
| 5,415,107 | 5/1995 | Tutzauer . | |

FOREIGN PATENT DOCUMENTS

| | | |
|---|---|---|
| 1159339 | 7/1958 | France . |
| 1009220 | 5/1957 | Germany . |
| 1106359 | 5/1961 | Germany . |
| 2444887 | 4/1975 | Germany . |
| 3039887 | 5/1981 | Germany . |
| 3120105 | 5/1982 | Germany . |
| 4136926 | 5/1995 | Germany . |

*Primary Examiner*—Mark T. Le
*Attorney, Agent, or Firm*—Smith, Gambrell & Russell, LLP

[57] ABSTRACT

A twin-axle rail vehicle bogie with two extended wheel sets and bearings and a bogie frame on which the wheel sets are sprung. The load-bearing part of the bogie frame includes a bogie cross member to which are connected a first link for a first of the two wheel sets and a second link for the other. Both the first and second links have a first free end which is pivoted about an axis on the bogie cross-member. The first and second links have a second free end link to a main suspension system where the wheel set bearing is fitted at a point between the first and second free ends. Both links have an upper shank ending at the second free end and running substantially vertically, and the main suspension system is arranged in such a way that it exerts horizontally-acting spring forces on the second free end.

18 Claims, 4 Drawing Sheets

TWIN-AXLE RAIL VEHICLE BOGIE

BACKGROUND OF THE INVENTION

1. Field of the Invention

The present invention relates to a twin-axle rail vehicle bogie.

2. Description of the Related Art

Conventional bogies are known which are provided with a bogie frame comprising a cross beam extending transversely to the direction of travel and longitudinal beams being attached to the cross beam and extending in the direction of travel. Conventionally, the cross beam supports a centrally arranged pivoted bolster serving to connect the bogie to the bottom side of the vehicle so that it is pivotal about the vertical axis. The two wheel sets are externally hingedly connected to a main suspension system with a substantially vertically directed spring force. Conventionally, the upper, free end of the suspension system is hingedly connected to the longitudinal beam. Furthermore, the wheel set is hingedly connected to the bogie frame by longitudinal control arms for the transfer of longitudinal forces. In order to achieve a suitable rigidity of the bogie frame, conventional longitudinal beams used to be linked with each other on their outer free ends by additional cross beams, so that in fact a closed frame was used.

For certain special vehicles, however, it was desirable to make the bogies light, as compact as possible and of particularly small overall height. For these purposes, it was desirable to use wheels of smaller diameter, which, however, led to problems with regard to derailment safety. Therefore, a considerable static spring deflection height of the wheel set in connection with a hydraulic oscillation damper system had to be provided. As a consequence, the vertically extending main suspension system had to be made accordingly large, resulting in an undesirably great overall height. Apart from that, the conventional bogie frame with longitudinal beams was relatively heavy and of great overall height, which is also due to the fact that the longitudinal beams of the conventional bogie frame were required to extend in a position above the wheel in order to accommodate the springs.

The DE-AS 24 44 887 discloses a bogie for rail vehicles which is included in the generic category, with a link being hingedly connected to a bogie cross beam at one of its free ends and supporting the wheel set bearing on its other free end. Suspension is effected by leaf springs entending below the link.

SUMMARY OF THE INVENTION

The object of the present invention is to provide a twinaxle rail vehicle bogie of the above described type, which meets high requirements regarding derailment safety, and which at the same time comprises the smallest possible structural dimensions and lowest possible weight, and in particular a small overall height.

According to the present invention, this is achieved by the features defined in the characterizing part of claim 1. Advantageous embodiments are described in the dependent claims.

In other words, according to the present invention the conventional longitudinal beams which are arranged on each longitudinal side of the bogie are each replaced by a first and a second link. Wheel set shaft bearings, which may advantageously be in the form of anti-friction bearings accommodated in plummer blocks, are screw-fitted to these two links. The two links on each side of the bogie are commonly fastened to the bogie cross beam, so that they are capable of oscillating relative to each other. Thus, forces are transmitted via the plummer blocks from the wheel contact points on the rails to the links, with the links mutually supporting each other through a suspension system installed inbetween them.

In this way, it is possible to provide a considerable spring deflection height of the wheel sets in spite of the very small overall height, thus ensuring a high derailment safety. In addition, a reduction in weight is achieved because of the simpler structure of the bogie frame. Furthermore, a small axle base is achieved, making the bogies according to the present invention particularly suitable for the transport of tall loads without exceeding the permissible clearance gauge of the vehicle, i.e. for rail vehicles of small floor level height. Examples of bogies of this type are pivoted-bolster type bogies for special conveyance jobs such as the transport of overlength cargo, or built-in bogies to be installed under special undercarriages.

According to an advantageous embodiment, the first and second links are pivotal about a common pivot in order to achieve a possibly great length of the links while keeping the design simple. According to another embodiment, the first and second links are each hingedly connected to the bogie cross beam at a different hinge point, with these hinge points being spaced apart in the direction of travel.

According to still another advantageous embodiment, the first and second links are identical, with both links having a substantially angular shape as seen from the side, and with the lower leg of the angle, forming the first free end, extending in a substantially horizontal direction, and the upper leg of the angle, forming the second free end, extending in a substantially vertical direction, and with the wheel set bearing being substantially arranged at the intersection of these two legs. In this way, the structure will require particularly little space, so that important functional elements can be accommodated between the upper, vertically extending legs.

For placing the spring elements or the single spring element between the two ends of the links, the links are not necessarily required to have an angular shape, but must at least comprise a portion extending above the wheel set axes in the vertical direction. The main suspension system does not have to act in the horizontal direction, although in view of a small overall height of the bogie a substantially horizontal direction of action would be the optimum solution.

According to another advantageous embodiment of the present invention, each main suspension system of the first and second links extends from the respective second end in a substantially horizontal direction so that each of the two main suspension systems is arranged between the second free ends of adjacent first and second links. In this way, the suspension system can be accommodated in a particularly space-saving manner, with a small overall height being ensured at the same time.

It is also possible to advantageously provide a single main suspension system comprising only one single compression spring, for example, and being arranged between the second free ends of adjacent first and second links, thus connecting these free ends with each other.

According to an advantageous embodiment, a further reduction in the overall height may be achieved by providing the respective pivot point at the first free end of the first and also of the second link at a height below the wheel axis of the first and second wheel sets, respectively.

According to a particularly advantageous embodiment of the present invention, a hydraulic spring blocking cylinder is additionally arranged at each of the links next to the respective main suspension system. Alternatively, only one single spring blocking cylinder may be provided, extending substantially parallel to the main suspension system and connecting the two second ends of the two links to each other. Inside the cylinder, one or two pistons are slidably arranged, and oil ducts are provided in the cylinder on both sides of the piston. By supplying oil to the cylinder chambers on both sides of the piston until both the chambers are completely filled with oil, and shutting off the oil supply lines afterwards, the piston may be locked in any desired position, thus preventing a further spring deflection of the respective link connected to the piston rod at its second end. If two separate piston-cylinder-units are provided, they may be hingedly connected to the bogie cross beam. A particularly advantageous alternative, however, is the provision of only one single cylinder in which two pistons are arranged. By blocking this single cylinder a further spring deflection may be prevented, thus preventing an excessive rolling angle caused for example by an uneven distribution of cargo. The system will subsequently still be able to oscillate in order to compensate for an uneven ground surface. A spring blocking system of the above type is particularly advantageous in the case of high unilateral moments of force occurring at cranes or construction platforms, where a rolling angle between the vehicle and the bogie caused by unilateral spring deflection resulting from these moments of force has to be prevented. If necessary, the vehicle has to remain moveable even under the influence of these moments of force, which requires the system to keep its ability to oscillate.

If a possible limitation of the rolling angle is not important, the spring blocking cylinder may be replaced by a simple damping cylinder which is preferably hydraulically operated.

Due to a embodiment according to the present invention, the hydraulic spring blocking cylinders may be switched over from the spring blocking mode of operation to a oscillation damping mode of operation, for which purpose the spring blocking cylinders are connected to an external throttle. This throttle may be designed to be adjustable to the temperature-related viscosity of the hydraulic oil.

As a further invention, the advantages of a spring blocking cylinder and the advantages of a oscillation damper system have been combined without requiring additional oscillation damping cylinders. Since the throttle is arranged in an external position, it may be designed to be adjustable to the temperature-related viscosity of the oil. A oscillation damper system of this type increases the derailment safety.

The bogie is hingedly connected to the vehicle in such a way that it is pivotal about a pivot pin, i.e. that it is rotatable about the vertical axis. Furthermore, the bogie has to allow for at least a small rolling angle relative to the vehicle in order to enable the vehicle to enter a curve having a banking, since the vehicle comprises several bogies which are spaced apart in the direction of travel so that the increasing banking requires the bogie entering the curve at first to allow for a rolling angle, especially if the vehicle body is very stiff against torsion. In particular in the case of special vehicles carrying lifting cranes or construction platforms, however, rolling has to be prevented. For this purpose, anti-rolling members may additionally be provided which limit the rolling angle of the bogie relative to the vehicle to a specific angle, for example 2°.

According to another advantageous embodiment of the present invention, the main suspension systems comprise elastomer springs made of vulcanite, for example. Likewise, the main suspension systems may advantageously be provided with a set of cup springs, or a coil compression spring could also be used.

Advantageously, the main suspension systems are interchangeable in order to adapt the system to different axle loads, and comprise identical fitting lengths for a specific static load. Thus, the bogie desired for a specific application may be assembled from single modules chosen for the desired axle load, for example, or the bogie may be retrofitted accordingly. Additionally, the wheel hubs may be connected to the wheel set shafts by means of wedged-in fasteners in such a way that the position of the wheels on the wheel set shafts may be changed to enable the bogies to be quickly adjusted to a different gauge.

Advantageously, the bogie according to the present invention is developed further in such a way that the main suspension systems are on the side of the links mounted at main suspension system support plates, with the main suspension systems of the first and second links being arranged horizontally and coaxially to each other, and each of the main suspension systems being guided by a guiding column rendering the system buckleproof, with the guiding columns being supported in the main suspension system support plates and each having a collar at its longitudinal centre by means of which the guiding column is held by the main suspension system. Thus, the main suspension systems, for example the cup spring assembly, are prevented from buckling. Moreover, the guiding columns facilitate the assembly of the suspension systems.

According to an advantageous embodiment, the bogie may be lifted and moved via a pivot pin by means of a sliding plate, cover disk, nut and load-bearing bolt, when it is used under special vehicles. Thus, the bogie according to the invention is suitable for lorries operating in a so-called rail-road scheme, where the bogie located under the lorry may be lifted for driving on the road, while the lorry is supported by the bogies for transport on rail. In order to additionally facilitate the entry into the rail system, at least one of the bogies of the rail-road vehicle may be pivotal about a vertical pivot pin by at least 90°. For road traffic, the bogie may advantageously be pulled under the special vehicle by a hydraulic telescopic arm.

Although the wheel sets may be driven by any type of drive system, for example by a diesel engine directly driving one of the wheel sets via a transmission, or by a diesel-electric or diesel-hydraulic drive system, or by an electric motor, it has proved to be an advantage to drive one of the wheel sets by means of a hydrostatic motor, with possible designs being a wheel-type motor or an axle-transmission-type motor.

Advantageously, at least one of the wheel sets is provided with a disk brake, which results in a further reduction in structural dimensions as compared with a brake block system which would also be possible in general.

BRIEF DESCRIPTION OF THE DRAWING

The present invention will now be described by means of example of a preferred embodiment and with reference to the drawings.

DETAILED DESCRIPTION OF THE INVENTION

Figure 3:
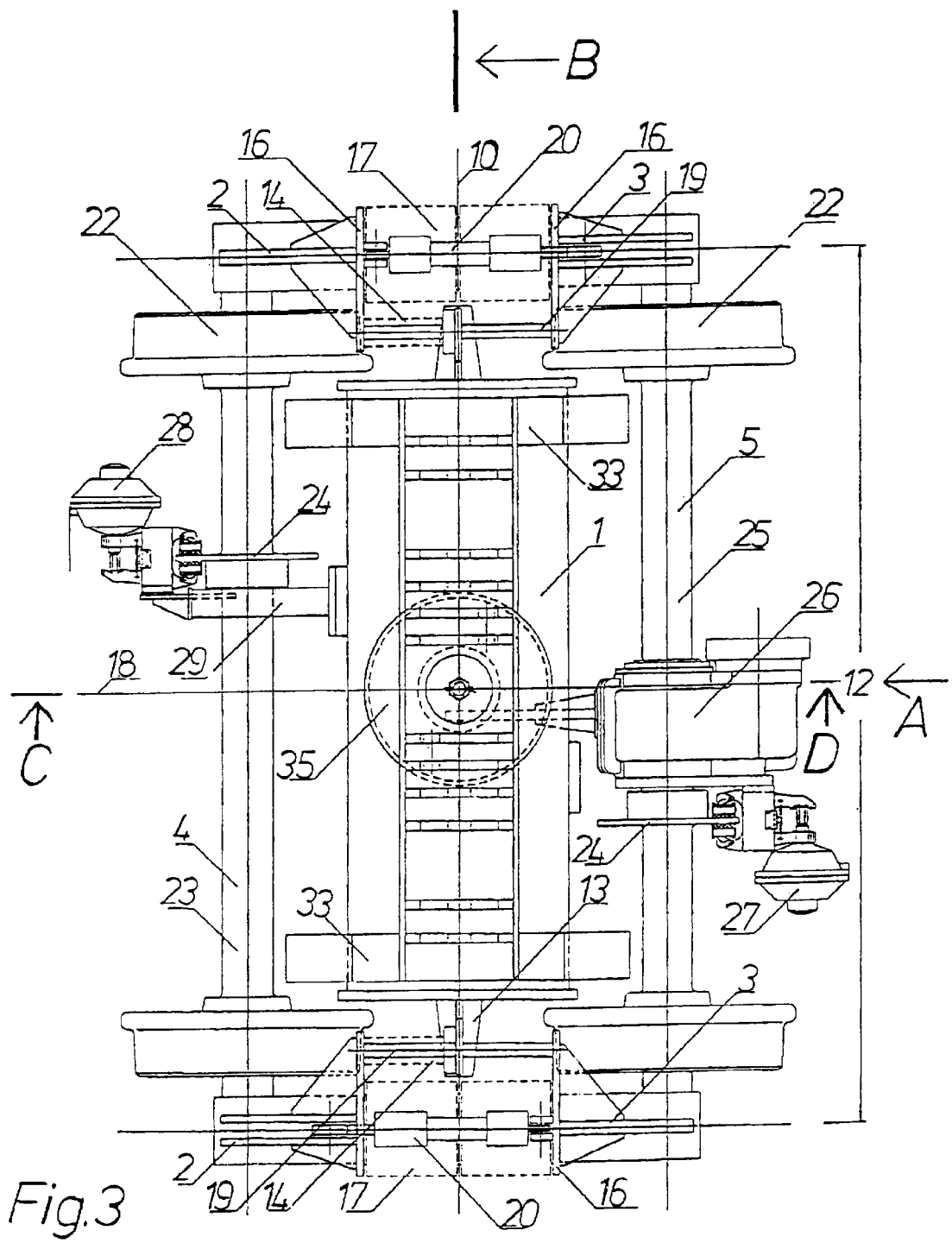
FIG. 3 is a top view of a bogie without connecting means.

FIG. 3 shows a top view of the bogie comprising as basic elements a bogie cross beam 1, a first link 2 being pulled when the vehicle travels to the right with reference to FIG. 3, a second link 3 being pushed when the vehicle travels to the right with reference to FIG. 3, a first wheel set 4 designed as a driving wheel set, and a second wheel set 5 designed as a driven wheel set. Furthermore, as can be seen from FIG. 1, connecting means are provided for connection to the transporting unit 6. As can be seen from FIG. 4, the connecting means may comprise lifting/lowering devices 8 designed with a pivoted bolster 7 forming the hydraulic cylinder, as well as the required number of lifting/lowering guides 9 which also take up the pull and brake forces as well as lateral guiding forces between the bogie and the transporting unit.

Link bearing pins 11 are attached to the bogie cross beam at the transverse centre 10 of the bogie. A link 2 and a link 3 are each pivotally supported on the link bearing pins at the wheel bearing centre distance 12 (FIG. 3). Furthermore, a stopper 13 is attached to the bogie cross beam 1 at the transverse centre 10 of the bogie, which together with the spring elements 14 prevents the bogie from tilting excessively to one side when the latter is in a raised position.

The spring elements 14 are supported on the axle fork stay bolt 19 which has a specific length adjusted to the distance defined by the main suspension system support plate 16 and which ensures a defined rebound travel of the two wheel sets 4 and 5 when the bogie is in a raised position under a rail-road vehicle.

When the wheel sets 4 and 5, respectively, are spring-deflected each of the links 2, 3 is supported by one of the main suspension systems 17 via the support plates 16. The main suspension system support plates 16 transmit forces from the links 2, 3 acting in a horizontal direction towards the longitudinal centre 18 of the bogie. Axle fork stay bolts 19 are additionally provided. Furthermore, spring blocking cylinders 20 are provided serving simultaneously as oscillation dampers. This is effected by means of an external throttle connected to the said spring blocking cylinder 20 as well as by hydraulic line connections provided at both ends of the spring blocking cylinder 20 and connected with each other via an adjustable throttle. The spring blocking cylinder 20 may thus also be used as a oscillation damper by adjusting the throttle to a defined opening size so that hydraulic oil is enabled to flow via the throttle from a first cylinder chamber located on a first side of the piston to the second cylinder chamber located on a second side of the piston.

The links 2, 3 are supported on the externally supported wheel sets 4 and 5 at the centre distance 12 and by means of wheel set bearings 21 equipped with self-aligning roller bearings. When used as a running wheel set, the wheel set 4 substantially consists of one part or multipart wheels 22, a wheel set shaft 23, and a brake disk 24 which may also be designed as a multipart brake disk 24. Similarly, the driving wheel set design of the wheel set 5 substantially consists of a wheel set shaft 25, and a wheel set transmission 26 mounted thereon and having a brake unit 27 attached to it.

A respective brake unit 28 is also provided at the wheel set 4 designed as a driving wheel set, with the brake unit 28 being connected to the bogie cross beam 1 via a girder 29. Furthermore, fasteners 30 are attached to the bogie cross beam 1 and serve to take up the reaction forces from the torque applied on the driven wheel set 5 by the wheel set transmission 26. Furthermore, the bogie cross beam is equipped with multipart, adjustable anti-rolling members 31 acting towards the pivoted bolster 7 and thus serving to limit the rolling angle to a small range, which is imperative in particular for vehicles equipped with a crane as well as for vehicles equipped with a construction platform. The anti-rolling member 31 is provided with a gap 32 having a width of just one millimeter in the described preferred embodiment. In the case of special vehicles such as rail-road vehicles, the vehicle itself is slightly less rigid as compared with conventional railway waggons, so that the compensating motion required upon entering a curve with banking may to a small extent also be achieved by the torsion of the vehicle body itself.

Furthermore, entry aids 33 are attached to the bogie cross beam 1 which facilitate the rotation of the bogie about the vertical axis 34, i.e. about the pivot pin 35.

The pivot pin 35 shown herein consists of a base plate 36 taking up all vertical and horizontal forces, with said base plate 36 being screw-fitted to the bogie cross beam 1. The load-bearing bolt 37 is supported in the base plate 36, as is the large sliding plate 38 which is screw-fitted to the base plate 36. The sliding plate 38 comprises a sliding surface 39 which is protected from soiling by an upper cover plate 40. A peripheral edge 41 delimiting the cover plate 40 serves both to transmit forces and to prevent dirt from entering the space between the cover plate 40 and the sliding surface 39.

In the described embodiment, the pivoted bolster 7 is supported on the upper cover plate 40. The pivoted bolster 7 in turn supports the entire bogie via a small sliding plate 42 being attached to the bogie, a cover disk 43 and a nut 44 being attached to the load-bearing bolt 37, in order to provide the bogie with a mounting means for transportation.

For connecting the pivoted bolster 7 to the transporting unit (for example the rail-road vehicle 6) by means of the lifting/lowering devices 8 being designed as telescopic hydraulic cylinders in this particular case, or by means of the lifting/lowering guides 9, a connection formed by a bracket 45 and a pin 46 was chosen for this particular embodiment.

Figure 4:
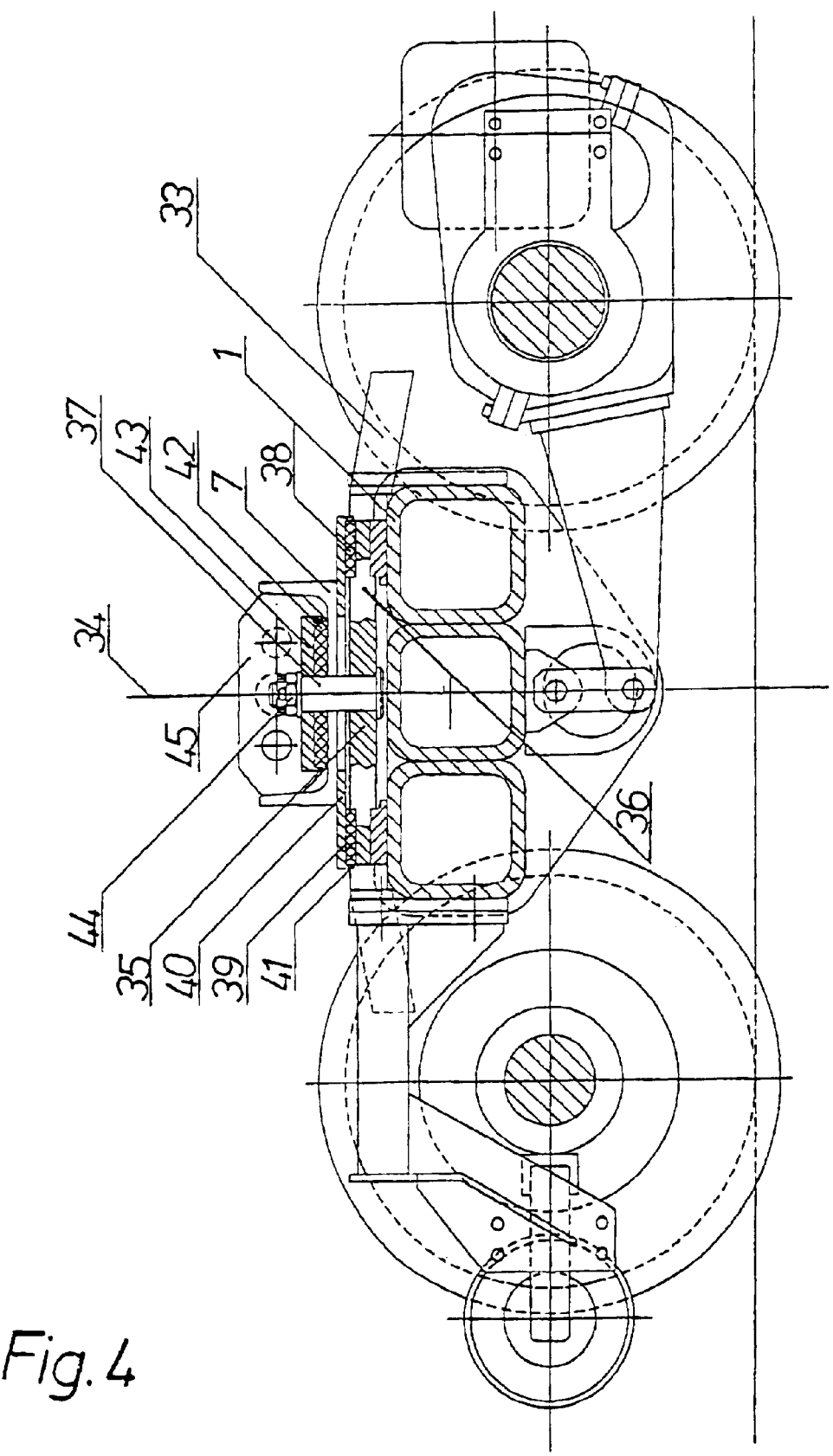
FIG. 4 shows a transverse section through the longitudinal centre of the bogie, indicated by the letters C–D in FIG. 3.

As can be seen in particular from FIG. 4, the bogie cross beam 1 is assembled from hollow sections, for example from three square tubes which have been welded together to form a relatively simple, but rigid structure.

Figure 1:
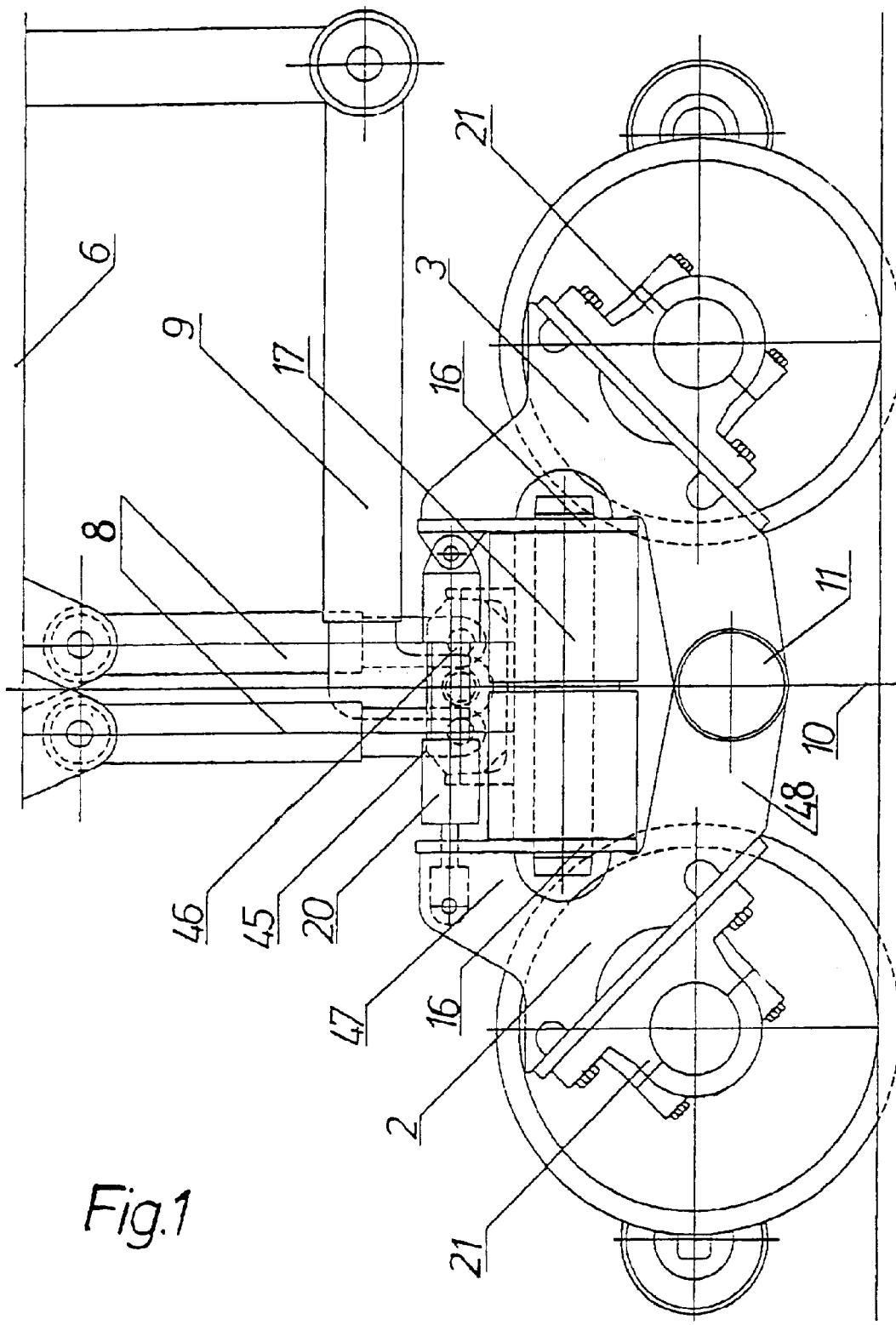
FIG. 1 is a side view of a bogie including connecting means for connection to a rail-road vehicle.
Figure 2:
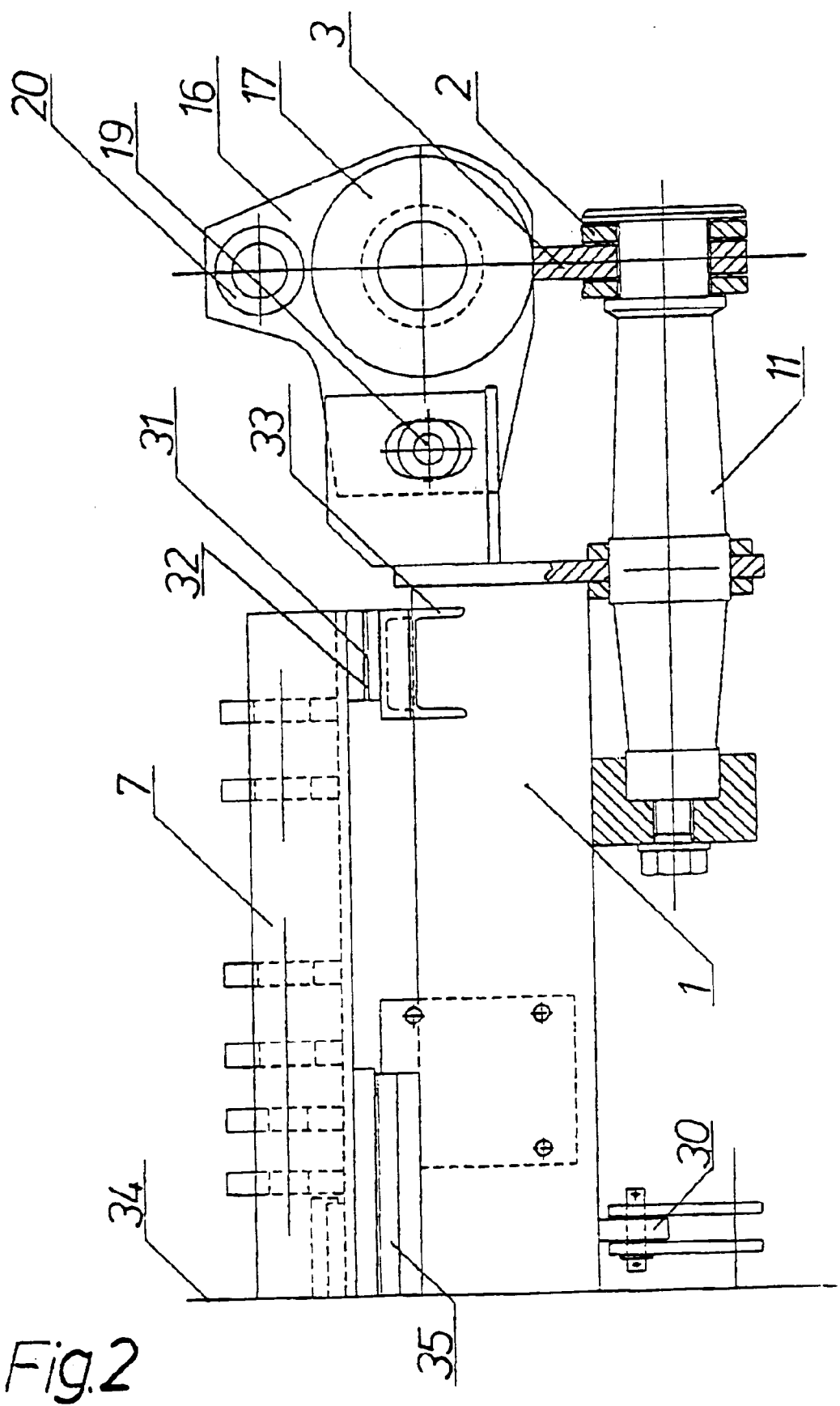
FIG. 2 shows a partially sectional view of the bogie, indicated by the letters A–B in FIG. 3.

The bogie is operated such that the links 2 and 3 may pivot about the link bearing pin 11, and in doing so compress the main suspension systems 17 against a spring force. The spring force is transmitted from the main suspension system support plates 16 to the links 2 and 3, respectively, and more precisely to the second end of the upper, vertical shank 47 of the respective link, as shown in FIG. 1. Spring blocking cylinders which can be switched over from the spring-blocking mode of operation to the oscillation-damping mode of operation, and which are also hingedly connected to the second free end of the link 2 and 3, respectively, i.e. at the outer end of the shank 47, extend parallel to the main suspension systems 17. The lower shank 48, which extends substantially horizontally, terminates in the link bearing pin 11. The wheel set bearing 21 is substantially arranged in the position where the vertical shank 47 and the horizontal shank 48 intersect. The substantially horizontal shank 48 extends with a slight downward inclination, so that the centre of the link bearing pin 11 is located below the wheel axis, thus providing sufficient space for the installation of the main suspension system and other functional elements such as the spring blocking cylinders 20 and the spring elements 14, without increasing the overall height of the bogie.

What is claimed is:

1. A twin-axle rail vehicle bogie having two wheel sets externally supported in wheel set bearings and a bogie frame on which the wheel sets are sprung, comprising:
   a bogie cross beam forming a load-bearing part of the bogie frame;
   a first link for a first of the two wheel sets hingedly connected on a first bogie side;
   a second link for the second of the two wheel sets hingedly connected on a second bogie side;
   both the first and the second link having a first free end which is hingedly connected to the bogie cross beam in such a manner that it is pivotal about a common pivot
   wherein the first and second links have a second free end hingedly connected to a main suspension system;
   a respective one of the wheel set bearings set bearing being arranged at a point between the first and second free ends;
   each said link having an upper shank which ends at the second free end;
   the second free end being located above an axis of rotation of the wheel sets;
   the main suspension system being arranged in such a way that it exerts substantially horizontally acting spring forces on the second free ends.

2. A bogie according to claim 1, wherein the first link and the second link are identical, and both said first and second links substantially have the form of an angle as seen from a side, with a lower shank ending in the first free end and extending substantially horizontally being provided in addition to the upper shank, with the wheel set bearing being substantially arranged at an intersection of upper and lower shanks.

3. A bogie according to claim 1, wherein at least one of the wheel sets is adopted to be connected with a disk brake.

4. A bogie according to claim 1 further comprising a main suspension system of each of the first and second links respectively, extending from the respective second free end in a substantially horizontal direction so that the two main suspension systems are arranged between the second free ends of adjacent first and second links.

5. A bogie according to claim 1, further comprising a single main suspension system extending in a substantially horizontal direction from the second free end of the first link to the second free end of the second link, thus connecting the second ends of the two links with each other.

6. A bogie according to claim 1, wherein the common pivot at the first free end of the first, and also of the second, link is arranged below a wheel axis of the first and second wheel sets.

7. A bogie according to claim 1, further comprising a hydraulic spring blocking cylinder additionally arranged at the second end of each link next to the main suspension system and extending substantially parallel to the main suspension.

8. A bogie according to claim 1, further comprising a single hydraulic spring blocking cylinder provided next to the main suspension system and extending substantially parallel to the main suspension system, with said hydraulic spring blocking cylinder extending from the second free end of the first link to the second free end of the second link in a substantially horizontal direction, thus connecting the second ends of the two links with each other.

9. A bogie according to claim 7, wherein when the hydraulic spring blocking cylinder is switched over from a spring-blocking mode of operation to an oscillation-damping mode of operation, the spring blocking cylinder is connected to an external throttle.

10. A bogie according to claim 1, further comprising anti-rolling members which limit the rolling angle of the bogie.

11. A bogie according to claim 10, wherein the rolling angle is limited to 2°.

12. A bogie according to claim 1, wherein the main suspension system include at least an elastomer spring.

13. A bogie according to claim 1, wherein the main suspension system include at least a cup spring.

14. A bogie according to claim 12, wherein the main suspention system includes at least two main suspensions which are interchangeable for different axle loads and have identical fitting lengths for a specific static load.

15. A bogie according to claim 1, wherein the main suspension system is attached to main suspension system support plates on the sides of the links, the main suspension system of the first and second links is horizontally positioned.

16. A bogie according to claim 1, wherein the bogie is adapted to be lifted and moved via a pivot pin connected to a sliding plate, a cover disk, a nut and a load-bearing bolt when used under special vehicles.

17. A bogie according to claim 16, wherein the bogie is adapted to be attached to a hydraulic telescopic arm for pulling the bogie under the special vehicle.

18. A bogie according to claim 1, wherein at least one of the two wheel sets is adopted to be driven by a hydrostatic motor.

* * * * *